(12) United States Patent
Morin (10) Patent No.: US 6,582,258 B2
(45) Date of Patent: Jun. 24, 2003

(54) FLOATING TRACK DEVICE (75) Inventor: Pierre Morin, 628 Goyette, Magog Quebec (CA), J1X 4Z1

(73) Assignee: Pierre Morin, Magog (CA)

( * ) Notice: Subject to any disclaimer, the term of this patent is extended or adjusted under 35 U.S.C. 154(b) by 0 days.

(21) Appl. No.: 09/839,489

(22) Filed: Apr. 23, 2001

(65) Prior Publication Data

US 2002/0155765 A1 Oct. 24, 2002

(51) Int. Cl.$^7$ .............................. B60F 3/00; B62D 55/00
(52) U.S. Cl. ..................................... 440/12.63; 305/165
(58) Field of Search .......................... 440/12.56, 12.63, 440/12.64, 95, 98–100; 305/34, 157, 165, 180

(56) References Cited

U.S. PATENT DOCUMENTS

| ,056,660 A | * | 7/1866 | Young ............................. 416/7 |
| ,424,076 A | * | 3/1890 | Pond ............................. 416/7 |
| 1,913,605 A | * | 6/1933 | Martin ......................... 440/95 |
| 3,170,533 A | * | 2/1965 | Fewel et al. .................. 180/9.1 |
| 3,244,458 A | * | 4/1966 | Frost ............................ 305/34 |
| 3,313,263 A | * | 4/1967 | Ferguson ..................... 440/96 |
| 3,544,174 A | * | 12/1970 | Giacosa ........................ 305/34 |
| 3,548,962 A | * | 12/1970 | Best ............................. 305/34 |
| 3,712,688 A | * | 1/1973 | Russell ........................ 305/34 |
| 3,902,766 A | * | 9/1975 | Kowachek et al. ............ 305/34 |
| 3,951,093 A | | 4/1976 | Poche |
| 3,976,025 A | | 8/1976 | Russell |
| 4,073,143 A | | 2/1978 | Preus |
| 4,715,668 A | * | 12/1987 | Burmeister ................... 305/34 |
| 4,953,921 A | * | 9/1990 | Burns .......................... 305/165 |
| 4,961,395 A | | 10/1990 | Coast |
| D324,356 S | | 3/1992 | Rollinson et al. |
| 5,685,616 A | * | 11/1997 | Burns .......................... 305/191 |
| 5,845,593 A | * | 12/1998 | Birkestrand .............. 114/39.11 |
| 6,017,289 A | | 1/2000 | Gaffney |

* cited by examiner

Primary Examiner—S. Joseph Morano
Assistant Examiner—Andrew Wright (57) ABSTRACT A floating track device for releasable attachment to a drive mechanism of an existing vehicle for supporting, floating, moving and steering the vehicle on a traveling surface includes an endless belt member to weight support the vehicle on the traveling surface. The endless belt member includes a belt endless inner layer spaced from a belt endless outer layer so as to define a plurality of inner and outer surface sections there along. The inner and outer surface sections form generally elongated floating members positioned adjacent relative to each other and forming housings in which buoyant bodies are disposed. Each outer surface section forms an external corrugation of the endless belt member for traction. Each inner surface section includes an internal corrugation for releasable driving engagement with the vehicle drive mechanism. Holding rods, separating two adjacent floating members, hold and secure the complementary inner and outer surface sections to each other.

25 Claims, 7 Drawing Sheets

FLOATING TRACK DEVICE

FIELD OF THE INVENTION

The invention relates to vehicles, and more particularly to a floating track device for releasably attaching to a drive mechanism of the vehicle for supporting, floating, moving and steering the same on any traveling surfaces.

BACKGROUND OF THE INVENTION

Various special amphibious all terrain vehicles are known in the art. However, these known vehicles usually have a limitation in their use and cannot be used in all seasons and over all types of traveling surfaces.

U.S. Pat. No. 3,976,025 granted on Aug. 24, 1976 to Russell discloses a floating track device that is solely used for flotation purpose, a separate tracking system is used to track the vehicle on water.

U.S. Pat. No. 3,951,093 granted on Apr. 20, 1976 to Poche discloses a heavy load amphibious vehicle with permanent floating tracks that only help for the floatation of the vehicle which already includes its inflated hulls as main floatation means. The tracks are not used for all traction, steering and floating purposes of the vehicle on all types of surfaces.

OBJECTS OF THE INVENTION

It is a general object of the present invention to provide a floating track device that obviates the above mentioned disadvantages.

Another object of the present invention is to provide a floating track device adaptable to wheeled and tracked existing vehicles with maximum all terrain mobility, so as to be retro-fitted thereon.

An advantage of the present invention is that the floating track device provides efficient propulsion on solid ground, water and in-between type grounds.

Still another advantage of the present invention is that the floating track device requires low energy propulsion compared with existing hovercrafts.

Yet another advantage of the present invention is that the floating track device is a safe design due to the plurality of independent floatable bodies, compared to hull design floating bodies.

Still a further advantage of the present invention is that the floating track device is of a simple economic construction.

Another further advantage of the present invention is that the floating track device is service friendly with multiple independent floating bodies.

An advantage of the present invention is that the floating track device is adaptable to a wheeled or tracked vehicle to combine flotation propulsion (traction) and steering of the vehicle, and that can be mounted to a wide range of vehicles from light-duty (as bicycle and the like) to heavy-duty vehicles (as existing track vehicles) to make it usable on any traveling surface; giving to the vehicle a maximum all terrain mobility.

Yet another further advantage of the present invention is that the a floating track device can be used as a basis for new design of total mobility vehicles that could be utilized in the field of transportation without any need of docking system or the like.

Other objects and advantages of the present invention will become apparent from a careful reading of the detailed description provided herein, with appropriate reference to the accompanying drawings.

SUMMARY OF THE INVENTION

According to an aspect, the present invention consists of a floating track device far attaching to a drive mechanism of a vehicle for supporting, floating, moving and steering the vehicle on a traveling surface, said floating track device comprises an endless belt member for weight supporting the vehicle on the traveling surface; said endless belt member including: generally elongated floating members positioned adjacent and in a parallel side-to-side relationship relative to each other so as to form said endless belt member; each of said floating members comprising an inner surface section and an outer surface section; each said inner surface section directly, releasably, and pivotally attached to adjacent said inner surface sections about a longitudinal axis substantially parallel to said inner surface sections so as to allow pivotal movement therebetween; each said inner surface section having an internal corrugation for releasable driving engagement with the vehicle drive mechanism; said outer surface section forming an external corrugation of said endless belt member for traction on the traveling surface; and said inner surface section and outer surface section of a respective said floating member being connected to form a housing in which a buoyant body is disposed.

Typically, the buoyant body is generally elongated for longitudinal and slidable engagement with respective said floating member.

Alternatively, each of said complementary inner and outer surface sections are peripherally sealed to each other so as to form a sealed floating member housing, and said buoyant body is a gaseous material enclosed within said sealed floating member housing.

According to another aspect, the present invention consists of a floating track device for attaching to a drive mechanism of a vehicle for supporting, floating, moving and steering the vehicle on a traveling surface, said floating track device comprises an endless belt member for weight supporting the vehicle on the traveling surface; said endless belt member including: an endless inner belt layer defining a plurality of adjacent inner surface sections therealong; each said inner surface section including an internal corrugation for releasable driving engagement with the vehicle drive mechanism, a plurality of outer surface sections, each said outer surface section attaching to a respective said inner surface section, each said outer surface section and complementary respective said inner surface section being connected to form a generally elongated floating member housing such that said endless belt member has a plurality of such floating member housings formed from the plurality of complementary inner and outer surface sections; each of said outer surface sections forming an external corrugation of said endless belt member for traction on the traveling surface; said floating member housings being disposed in generally parallel relationship to one another; each said floating member housing having a buoyant body releasably engaged therein; and holding means for connecting each said belt outer surface section to respective complementary inner surface section.

In one embodiment, the holding means includes an internal component protruding inwardly from a respective said inner surface section, each said internal component forming said internal corrugation of a respective said inner surface section.

In one embodiment, the outer surface sections adjacently extend from one another so as to form an endless outer belt layer, said inner and outer belt layers being in a generally superposed relationship relative to each other.

Typically, each of said inner surface sections forms an internal corrugation of said endless belt member, each said internal corrugation being substantially parallel to a respective complementary said external corrugation.

Typically, each of said internal corrugations is a substantial mirror image of its complementary external corrugation.

In one embodiment, each of said outer surface sections releasably connects to respective said inner surface sections.

In one embodiment, the drive mechanism includes wheels, said floating track device including a link system for releasably connecting said endless belt member to the wheels.

Typically, the vehicle further includes a steering mechanism, said link system including an adapter hardware for mounting on the vehicle so as to modify the steering mechanism of the vehicle to enable driving and steering the vehicle with said floating track device attached thereto.

According to another aspect, the present invention consists of a floating track kit for retro-fittingly attaching to a drive mechanism of an existing vehicle for supporting floating, moving and steering the existing vehicle on a traveling surface, the existing vehicle having two lateral sides with the drive mechanism thereon, the kit including at least one floating track device as defined above for each lateral side of the existing vehicle.

Preferably, the existing vehicle is a track vehicle having a vehicle track on each of lateral side thereof, each floating track device being for releasable attachment to a respective of the vehicle tracks.

Preferably, the kit includes an extension hardware for mounting on the existing vehicle so as to allow for attachment of elongated versions of the floating track devices to the existing vehicle.

BRIEF DESCRIPTION OF THE DRAWINGS

In the annexed drawings, like reference characters indicate like elements throughout.

DETAILED DESCRIPTION OF THE PREFERRED EMBODIMENTS

With reference to the annexed drawings the preferred embodiments of the present invention will be herein described for indicative purpose and by no means as of limitation.

Figure 1:
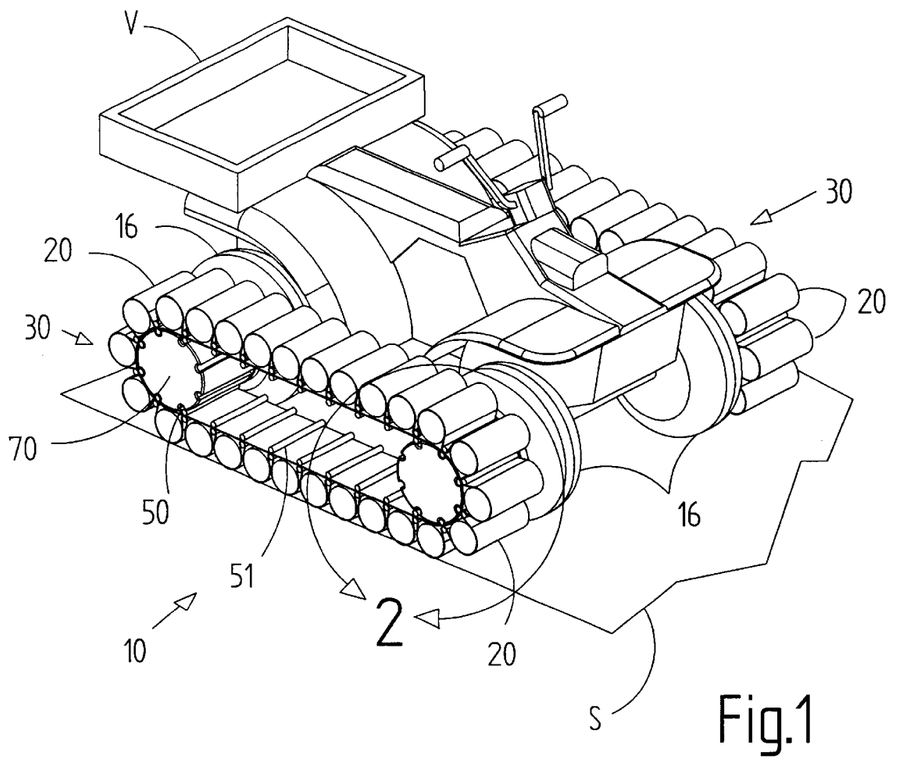
FIG. 1 is a perspective view of an embodiment of a floating track device according to the present invention attached to a medium-duty vehicle.
Figure 2:
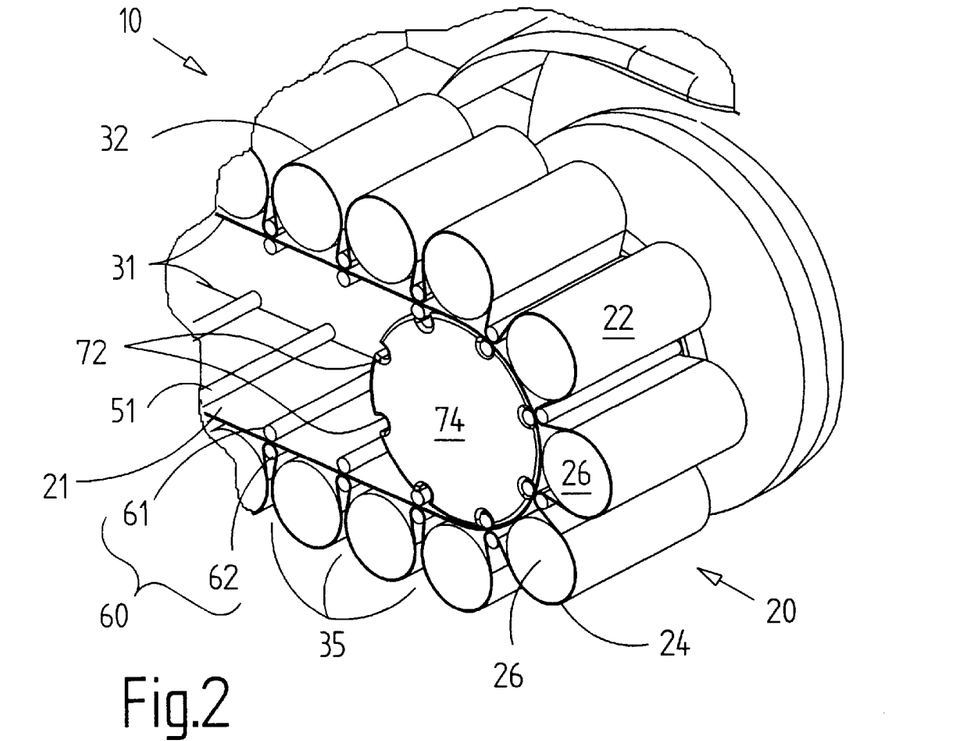
FIG. 2 is an enlarged section view taken along line 2 of FIG. 1, showing the floating track device with external corrugations.

Referring to FIGS. 1 and 2, there is shown an embodiment 10 of a floating track device according to the present invention adapted to be releasably attached to a drive mechanism 16 of a vehicle V, preferably wheels, for supporting, floating, moving and steering the vehicle V on any traveling surface S which can be normal ground, snow, water, marsh, ice and the like. The track device 10 comprises a plurality of generally elongated floating members 20 positioned adjacent and in a parallel side-to-side relationship relative to each other via respective securing members 40 (shown in FIG. 5) to form at least one endless belt member 30, and a belt connecting member, or retaining member 50 for, preferably releasable, driving engagement of the belt member 30 with the drive mechanism 16. Each floating member 20 is transverse to the belt member 30 and has an inner surface section 21 and an outer surface section 22. The latter forms an external corrugation 35 of the belt member 30 for traction on the traveling surface S, especially on water or the like by "pushing" on the same to Induce the forward motion of the vehicle V. The belt member 30 is adapted to weight support the vehicle V on the traveling surface S.

Each floating member 20 defines a housing 24 formed by the inner 21 and outer 22 surface sections that is preferably opened for releasable engagement by a low-density material body member 26.

All complementary inner 21 and outer 22 surface sections are preferably integral with all others, or extending from one another, respectively, to eliminate the need of securing members 40 between adjacent inner surface sections 21 so as to form a respective endless inner 31 and outer 32 layers of the belt member 30 secured to each other by holding means 60 (shown in FIG. 5) located in-between adjacent housings 24 formed by the two-layer belt member 30.

Each low-density material body member 26 is a buoyant body releasably secured into its respective housing 24. The buoyant body 28 is made out of inflatable, foam type, buoyant or the like material.

Figure 2A:
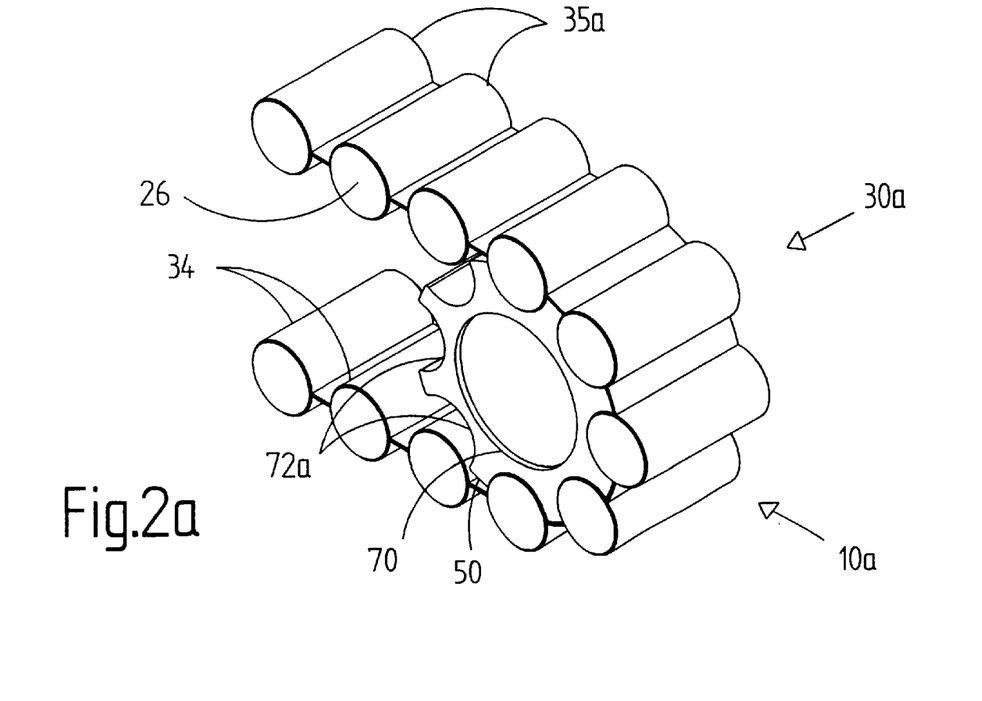
FIG. 2a is a view similar to FIG. 2, showing a second embodiment of a floating track device according to the present invention with external and internal corrugations.

Alternatively, as depicted in FIG. 2a, the housings 24 could be closed and/or sealed to be inflated or self-floating mold (not shown), depending on the manufacturing process considered, and the buoyant body 26 would obviously be a gaseous material retained therein by a valve or the like (not shown).

As illustrated in FIG. 2, each holding means 60 of the track device 10 preferably includes an inner 61 and outer 62 transverse rods inside internal layer 31 and outside external layer 32 respectively and attached to each other either externally or through the layers 31, 32. Accordingly, the internal layer 31 of the belt member 30 is essentially flat while the external layer 32 provides the external corrugations 35 of the outer surface sections 22 for traction of the belt member 30 on the traveling surface S.

The track device 10 further includes a link system 70 for releasably connecting the belt connecting member 50 to the drive mechanism 16. The belt connecting member 50 includes a tongue pattern 51, or internal corrugation 34, on the inner surface section 21 of the floating members 20 and formed by the inner rods 61, or internal component of the holding means 60, adapted to releasably engage a corresponding groove pattern 72 of the link system 70. Although not shown, the tongue pattern 51 could include circumferentially oriented portion along the belt member 30 to prevent axial sliding of the same relative to the wheels 74. Similarly, the rods 61, 62 could be integral to the floating members 20 if the latter are manufactured by molding process.

Alternatively, the inner 21 and outer 22 surface sections of all floating members 20 could be integral to each other as to form both the securing members 40 and the holding means 60 that are substantially radially centered relative to the buoyant bodies 26 to form internal corrugations 34 of the belt member 30a that are preferably a mirror image of the external corrugations 35a, as shown in a second embodiment 10a of the track device of FIG. 2a. In this latter case, the internal corrugations 34 are adapted to engage the groove pattern 72a as part of the belt connecting member 50 for releasable driving engagement with the drive mechanism 16. These types of floating track devices 10, 10a are preferably suitable for medium-duty vehicles such as four wheel all terrain vehicles and the like.

Figure 3:
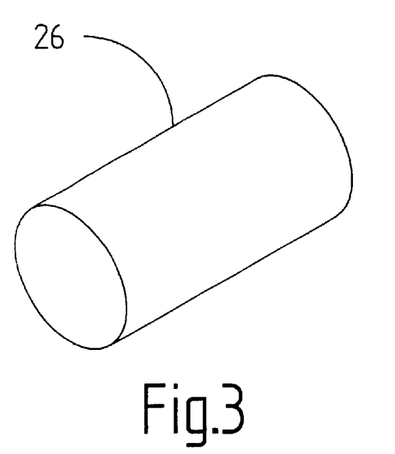
FIGS. 3, 3a and 3b are perspective views of embodiments of a buoyant body having a generally circular, triangular and polygonal cross-section shape respectively, FIG. 3a showing a longitudinally broken elongated buoyant body.
Figure 3A:
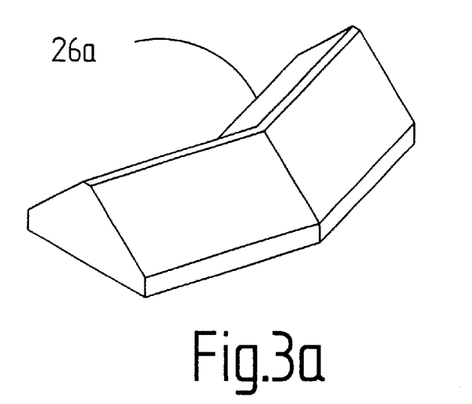
Figure 3B:
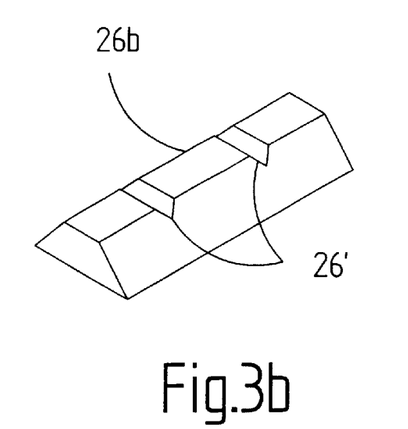
Figure 3C:
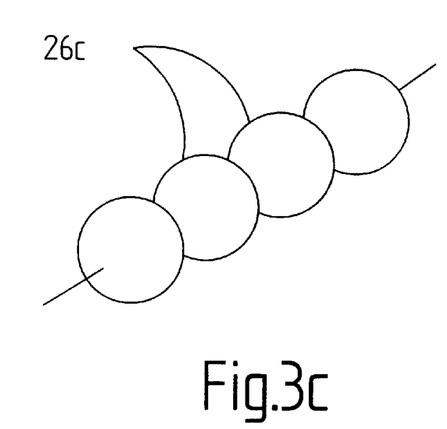
FIG. 3c is a perspective view of another embodiment of a buoyant body including a plurality of spherical pieces.

As shown in FIGS. 3, 3a, 3b and 3c, buoyant bodies 26 can be of different shapes with, for example: a generally circular cross-section 26 (FIG. 3), triangular cross-section 26a (see FIG. 3a), polygonal cross-section 26b (FIG. 5b), or include a plurality of aligned spherical shape pieces 26c (FIG. 3c). The buoyant body 26a has a broken longitudinal shape in a direction towards an adjacent buoyant body 26a for controlled flow of material, such as water or the like, along the belt member 30, and transverse to the body 26a, for improved traction (paddling action) of the same on the traveling surface S. Furthermore, the buoyant body 26b (or the floating members 20) can include cutouts 26' to also control the flow of water or the like material along the belt member 30 and improve the traction of the same on different traveling surfaces S.

Figure 4:
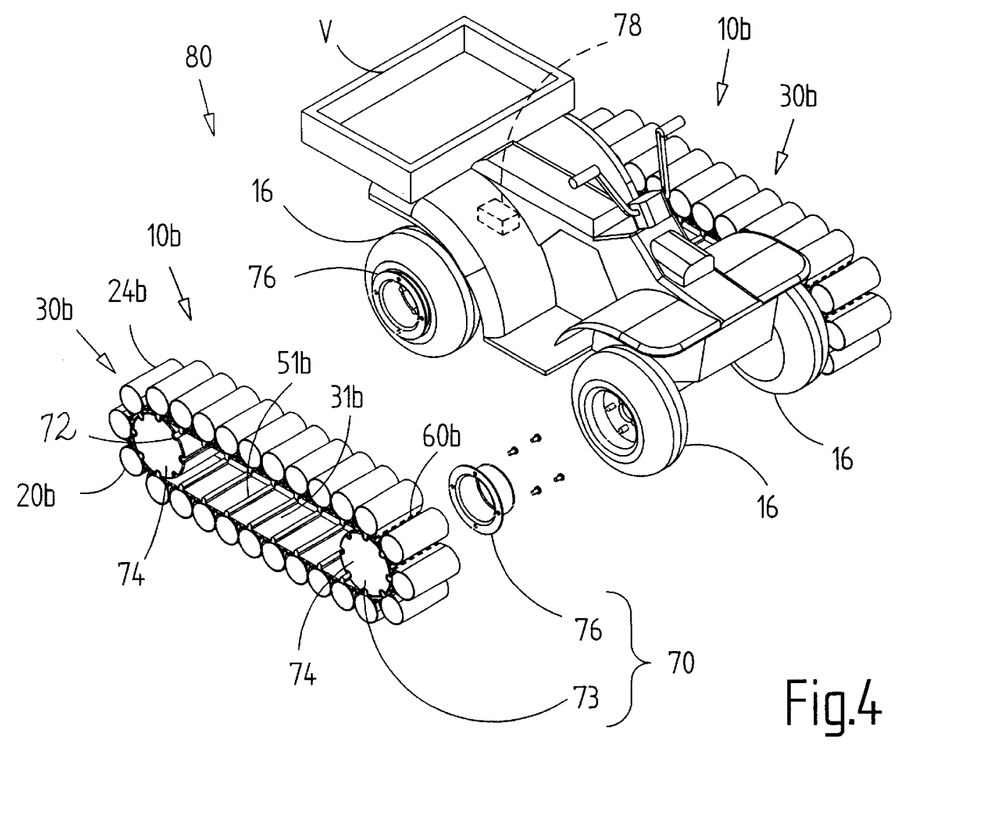
FIG. 4 is an exploded view of a third embodiment of a floating track device according to the present invention, showing the link system of the device.

As better illustrated in FIG. 4, the link system 70 includes a plurality of rolling members 73, including conventional idler members and wheels 74. Preferably, wheels 74 include the groove pattern 72 to engage the belt member 30b for guiding and driving the same (see slat FIG. 6). At least two of the wheels 74 are releasably secured to the drive mechanism 16, preferably wheels of the vehicle, using wheel adapters 76 that could remain mounted on the vehicle wheels even if the belt member 30b is being removed along with its wheels 74, or be integral to the same.

As well known in the art, at least one of the wheels 74 may be a tensioning member to ensure adequate tension of the belt member 30.

The belt member 30b of the third embodiment 10b of the track device shown in FIG. 4 has a continuous inner layer 31b with integral tongue pattern 51b, or internal corrugations. Each floating member housing 24b is releasably secured to the inner layer 31b via hinge-type holding means 60b or the like, thus forming a single-layer belt member 30b for medium-duty vehicles.

Preferably, the floating track device 10b is part of a floating track kit 80 adapted to be, preferably releasably, retro-fittingly attached to the drive mechanism 16 of an existing conventional vehicle V for supporting, floating, moving and steering the same on any traveling surface S. The kit 80 includes at least one floating track device 10b on each of the lateral sides of the vehicle V.

Figure 5:
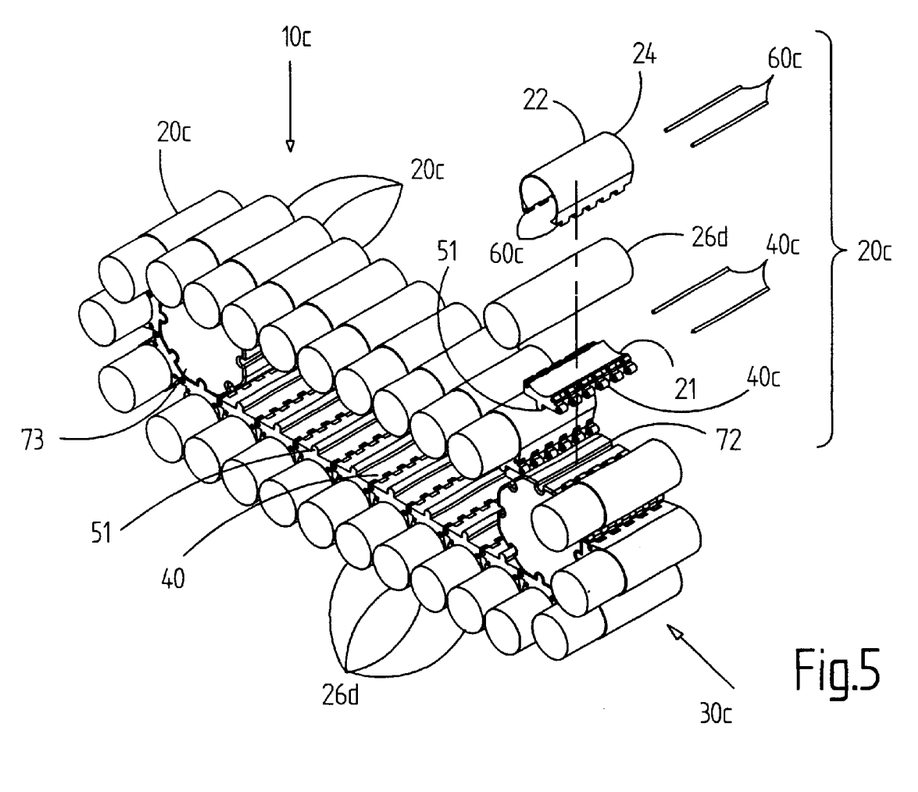
FIG. 5 is an exploded view of a fourth embodiment of a floating track device according to the present invention adapted for heavy-duty vehicles with extended floatable bodies.

For heavy-duty vehicles V, the fourth embodiment of the track device 10c illustrated in FIG. 5 includes a plurality of elongated floating members 20c similar to the one of FIG. 4 directly pivotally attached to each other via hinge type securing members 40c on the inner surface sections 21 to form the belt member 30c, similar to the hinge-type holding means 60c securing the outer surface section 22 of the housing 24 to the inner surface section 21. Additionally, the buoyant bodies 26d have an outwardly oriented extension to make them larger and support heavier vehicles V, or vehicles V with heavier loads.

For vehicles V already having "standard" tracks, it could be possible to directly secure floating members 20 forming the track devices 10 thereto, using holding means 60 similar to the one illustrated in FIG. 2. These track devices 10 would be available as kits for the track vehicles V.

Figure 6:
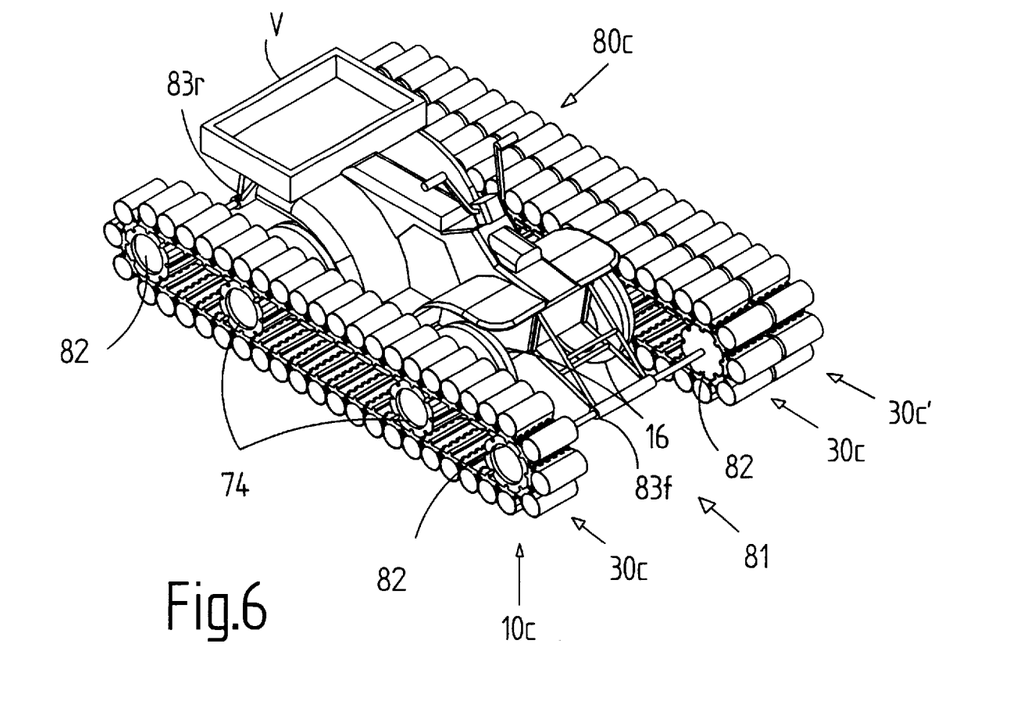
FIG. 6 is a view similar to FIG. 5, showing the fourth embodiment with extension hardware adapted for extended length of track device, and the possibility of having additional track devices on each side of the vehicle.

As illustrated in FIG. 6, the kit 80c includes additional extension hardware 81 mounted on the vehicle V to adapt the same to receive larger floating track devices lot engaging additional extension wheels 82 rotatably mounted on corresponding front 83f and rear 83r supports. Also, on each side of the vehicle V, a second belt member 30c' could be releasably secured to the corresponding first belt member 30c to increase the floatability and the stability of the vehicle V when heavy loads need to be carried.

Obviously, the kit 80c also includes adapter hardware (not shown) mounted on the vehicle V to modify its drive and steering mechanisms to properly drive and steer the same when using the floating track devices 10. For wheeled vehicles adapted with differential type drive system, the adapter hardware includes a releasable blocking device 78 (see FIG. 4) that includes a separate valve and modifies the existing braking hydraulic network from a front and rear brake control to a left and right brake control, and blocks the steering of the front wheels 16. A releasable steering device that enables independent speed control of the left and right wheels 16 for steering of the track vehicle V via a switching circuit and additional handle (not shown) could preferably be added on the steering bar.

Figure 7:
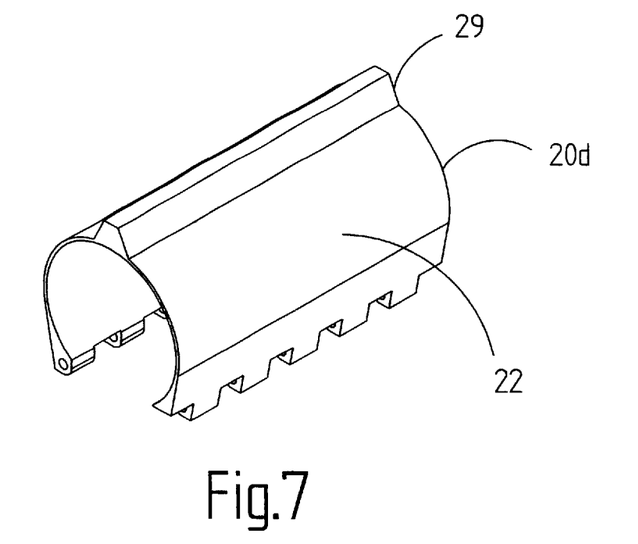
FIG. 7 is an example of an elongated floatable member having a cleat pattern on its outer surface.

As illustrated in FIG. 7, the outer surface section 22 of each floating member 20 could include a textured cleat pattern 29 to enhance the traction of the track device 10 on the traveling surface S with better control of the fluid (water, marsh, etc.) flow to improve and enhance traction of the track device 10 on that traveling surface S.

Figure 8:
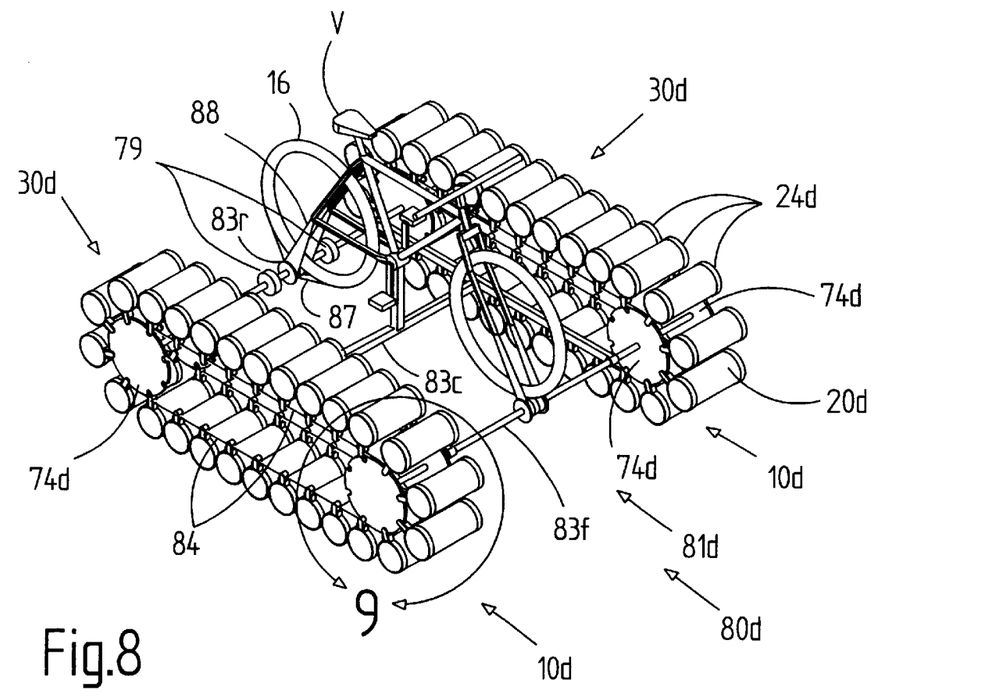
FIG. 8 is view similar to FIG. 1, showing a fifth embodiment of a floating track device according to the present invention adapted for light-duty vehicles.
Figure 9:
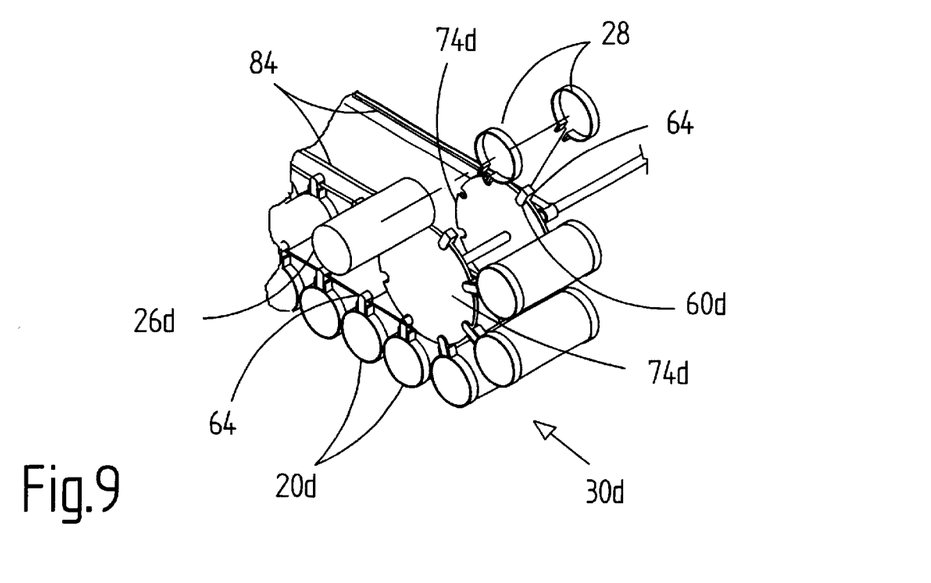
FIG. 9 is an enlarged partially exploded section view taken along line 9 of FIG. 8.

Referring to FIGS. 8 and 9, the light-duty track device 10d according to the present invention is part of the floating kit 80d with additional hardware 81d. The track devices 10d are symmetrically boated on the each side of the light vehicle V, which may be, for example, a bicycle or the like light-duty moving vehicles. The endless belt member 30d has a plurality of transverse housings 24d made out of two clips 28 adapted to receive a respective buoyant body members 26d and adjacently releasably secured via an attachment device 64 providing the holding means 60d to at least two endless preferably metallic cables 84 parallel to each other and retained on respective pulley-type wheels 74d engaged by the attachment devices 64. The clips 28 are preferably located at both longitudinal extremities of the bodies 26d. Obviously, the attachment devices 84, along with the clips 28, the floating members 20d and the cables 84, could be integrally pre-assembled to reduce the quantity of parts to be installed in the kit 80d.

In case of a bicycle, an additional central support 83c secured to both front 83f and rear 83r supports is used to support the pedal mechanism and the vehicle V in upright position. The rear wheel 16 of the bicycle drives a rear shaft of the rear support 83r and the track devices 10d either by friction or using a drive belt 87 kept in tension by a belt tensioning bracket 88.

Obviously, the light-duty vehicle V could simply be a structure having a seat member and a pedal mechanism such as a pedal boat or the like.

For steering vehicles V without differential type of drive system, each link system 70 includes a simple clutch member 79, installed on each side of the vehicle V on FIG. 8, to enable voluntary temporary disengagement between the respective track device 10 and the drive mechanism of the vehicle V.

Although the present floating track device has been described with a certain degree of particularity it is to be understood that the disclosure has been made by way of example only and that the present invention is not limited to the features of the embodiments described and illustrated herein, but includes all variations and modifications within the scope and spirit of the invention as hereinafter claimed.

I claim:

1. A floating track device for attaching to a drive mechanism of a vehicle for supporting, floating, moving and steering the vehicle on a traveling surface, said floating track device comprising:
   an endless belt member for weight supporting the vehicle on the traveling surface; said endless belt member including:
      generally elongated floating members positioned adjacent and in a parallel side-to-side relationship relative to each other so as to form said endless belt member,
      each of said floating members comprising an inner surface section and an outer surface section,
      each said inner surface section directly, releasably, and pivotally attached to adjacent said inner surface sections about a longitudinal axis substantially parallel to said inner surface sections so as to allow pivotal movement therebetween,
      each said inner surface section having an internal corrugation for releasable driving engagement with the vehicle drive mechanism,
      said outer surface section forming an external corrugation of said endless belt member for traction on the traveling surface; and
      said inner surface section and outer surface section of a respective said floating member being connected to form a housing in which a buoyant body is disposed.

2. A track device as defined in claim 1, wherein each of said complementary inner and outer surface sections are peripherally sealed to each other so as to form a sealed floating member housing, and said buoyant body is a gaseous material enclosed within said sealed floating member housing.

3. A track device as defined in claim 1, wherein said buoyant body is generally elongated for longitudinal and slidable engagement with respective said floating member.

4. A track device as defined in claim 1, wherein each of said floating members has a generally broken longitudinal shape in a direction towards an adjacent said floating members so as to allow controlled flow of material from the traveling surface along said floating track device end traction of said floating track device on the traveling surface.

5. A track device as defined in claim 1, wherein the vehicle further includes a steering mechanism, the drive mechanism including wheels, said floating track device including a link system for releasably connecting said endless belt member to the wheels, said link system includes an adapter hardware for mounting on the vehicle so as to modify the steering mechanism of the vehicle to enable driving and steering the vehicle with said floating track device attached thereto.

6. A floating track device for attaching to a drive mechanism of a vehicle for supporting, floating, moving and steering the vehicle on a traveling surface, said floating track device comprising:
   an endless belt member for weight supporting the vehicle on the traveling surface; said endless belt member including:
   an endless inner belt layer defining a plurality of adjacent inner surface sections therealong,
      each said inner surface section including an internal corrugation for releasable driving engagement with the vehicle drive mechanism,
      a plurality of outer surface sections, each said outer surface section attaching to a respective said inner surface section, each said outer surface section and complementary respective said inner surface section being connected to form a generally elongated floating member housing such that said endless belt member has a plurality of such floating member housings formed from the plurality of complementary inner and outer surface sections,
      each of said outer surface sections forming an external corrugation of said endless belt member for traction on the traveling surface,
      said floating member housings being disposed in generally parallel relationship to one another,
      each said floating member housing having a buoyant body releasably engaged therein; and
      holding means for connecting each said belt outer surface section to respective complementary inner surface section.

7. A track device as defined in claim 6, wherein said buoyant body is generally elongated for longitudinal and slidable engagement with respective said floating member housing.

8. A track device as defined in claim 7, wherein said buoyant body is made out of inflatable material.

9. A track device as defined in claim 7, wherein said buoyant body is made out of foam type material.

10. A track device as defined in claim 6, wherein said holding means includes an internal component protruding inwardly from a respective said inner surface section, each said internal component forming said internal corrugation of a respective said inner surface section.

11. A track device as defined in claim 6, wherein each of said complementary inner and outer surface sections are peripherally sealed to each other so as to form a sealed floating member housing, and said buoyant body is a gaseous material enclosed within said sealed floating member housing.

12. A track device as defined in claim 6, wherein said outer surface sections adjacently extend from one another so as to form an endless outer belt layer, said inner and outer belt layers being in a generally superposed relationship relative to each other.

13. A track device as defined in claim 12, wherein each of said inner surface sections forms an internal corrugation of said endless belt member, each said internal corrugation being substantially parallel to a respective complementary said external corrugation.

14. A track device as defined in claim 13, wherein each of said internal corrugations is a substantial mirror image of its complementary external corrugation.

15. A track device as defined in claim 6, wherein each of said outer surface sections releasably connects to respective said inner surface sections.

16. A track device as defined in claim 6, wherein the drive mechanism includes wheels, said floating track device including a link system for releasably connecting said endless belt member to the wheels.

17. A track device as defined in claim 16, wherein the vehicle further includes a steering mechanism, said link system including an adapter hardware for mounting on the vehicle so as to modify the steering mechanism of the vehicle to enable driving and steering the vehicle with said floating track device attached thereto.

18. A floating track kit for retro-fittingly attaching to a drive mechanism and to a steering mechanism of an existing vehicle for supporting, floating, moving and steering the existing vehicle on a traveling surface, the existing vehicle having two lateral sides with the drive mechanism thereon, said kit including at least one floating track device as defined in claim 17 for each lateral side of the existing vehicle.

19. A kit as defined in claim 18, further including an extension hardware for mounting on the existing vehicle so as to allow for attachment of elongated versions of said floating track devices to the existing vehicle.

20. A kit as defined in claim 19, wherein said extension hardware is part of said link system.

21. A track device as defined in claim 16, wherein said link system includes a plurality of rolling members engaging said endless belt member for guiding and driving said endless belt member, at least two of said plurality of rolling members being releasably secured to the wheels of the vehicle.

22. A track device as defined in claim 21, wherein said link system includes a groove pattern thereon, said internal corrugations of said inner surface sections releasably engaging said groove pattern of said link system for guiding and driving said endless belt member.

23. A track device as defined in claim 21, wherein said link system further includes a tensioning member for tensioning said belt member onto said rolling members.

24. A floating track kit for retro-fittingly attaching to a drive mechanism of an existing vehicle for supporting, floating, moving and steering the existing vehicle on a traveling surface, the existing vehicle having two lateral sides with the drive mechanism thereon, said kit including at least one floating, track device as defined in claim 6 for each lateral side of the existing vehicle.

25. A kit as defined in claim 24, wherein the existing vehicle is a track vehicle having a vehicle track on each of lateral side thereat each said floating track device being for releasable attachment to a respective of the vehicle tracks.

* * * * *